United States Patent
Lemmer et al.

(10) Patent No.: US 12,312,488 B2
(45) Date of Patent: May 27, 2025

(54) METHOD FOR PRODUCING EFFECT PIGMENT PASTES USING A VIBRATOR

(71) Applicant: BASF Coatings GmbH, Münster (DE)

(72) Inventors: Olga Lemmer, Münster (DE); Stephan Schwarte, Münster (DE); Michael Bruennemann, Münster (DE); Christian Kunkelmann, Ludwigshafen (DE); Ulrich Horstkoetter, Münster (DE); Hendrik Czaudema, Münster (DE); Sandra Kloetter, Münster (DE)

(73) Assignee: BASF COATINGS GMBH, Muenster (DE)

(*) Notice: Subject to any disclaimer, the term of this patent is extended or adjusted under 35 U.S.C. 154(b) by 629 days.

(21) Appl. No.: 17/633,985

(22) PCT Filed: Aug. 12, 2020

(86) PCT No.: PCT/EP2020/072606
§ 371 (c)(1),
(2) Date: Feb. 9, 2022

(87) PCT Pub. No.: WO2021/028466
PCT Pub. Date: Feb. 18, 2021

(65) Prior Publication Data
US 2022/0289998 A1 Sep. 15, 2022

(30) Foreign Application Priority Data
Aug. 12, 2019 (EP) .................... 19191237

(51) Int. Cl.
C09D 17/00 (2006.01)
B01F 31/60 (2022.01)
C09D 7/80 (2018.01)

(52) U.S. Cl.
CPC ............ C09D 17/006 (2013.01); B01F 31/60 (2022.01); C09D 7/80 (2018.01)

(58) Field of Classification Search
CPC ....... B01F 31/60; C01D 17/00; C01D 17/006; C09C 3/045; C09C 3/046; C09C 1/646; C09C 1/644; C09D 17/006; C09D 7/80; C09D 17/00
See application file for complete search history.

(56) References Cited

U.S. PATENT DOCUMENTS

| | | | |
|---|---|---|---|
| 2002/0097957 A1 | 7/2002 | Kikuchi et al. | |
| 2005/0085563 A1* | 4/2005 | Esselborn | C09D 7/45 523/160 |
| 2006/0155022 A1* | 7/2006 | Hupp | C09D 5/36 524/437 |
| 2007/0269606 A1* | 11/2007 | Schwarte | C08G 18/671 106/499 |
| 2015/0111149 A1 | 4/2015 | Chun | |

FOREIGN PATENT DOCUMENTS

| | | | | |
|---|---|---|---|---|
| CN | 108329758 A | | 7/2018 | |
| DE | 102004049095 A1 | | 4/2006 | |
| EP | 1080810 A1 | | 3/2001 | |
| EP | 1534792 B1 | | 5/2007 | |
| JP | 2633075 B2 | * | 7/1997 | .......... B01F 17/0064 |
| KR | 100903284 B1 | | 6/2009 | |
| KR | 10-20140135826 A1 | * | 11/2016 | .............. C09D 5/36 |
| WO | WO-2018/172475 A | * | 9/2018 | .............. C09D 17/00 |

OTHER PUBLICATIONS

International Search Report for corresponding PCT/EP2020/072606 mailed Oct. 23, 2020, 2 Pages.

* cited by examiner

Primary Examiner — Anthony J Green
(74) Attorney, Agent, or Firm — Armstrong Teasdale LLP

(57) ABSTRACT

Described herein is a process for producing an effect pigment paste including at least steps (1) and (2), namely producing a mixture including at least one effect pigment (a) and at least one polymer (b) in a liquid medium (c) (step (1)), and dispersing the mixture obtained after step (1) to obtain the effect pigment paste (step (2)), where step (2) is performed using a shaker and the effect pigment paste obtained after the performance of step (2) has ended is free of grinding media. Also described herein are an effect pigment paste producible by this process, containing an amount of effect pigment of at least 5% by weight, based on the total weight of the effect pigment paste, and a method of using a shaker for dispersing of effect pigments for production of an effect pigment paste.

19 Claims, No Drawings

METHOD FOR PRODUCING EFFECT PIGMENT PASTES USING A VIBRATOR

CROSS-REFERENCE TO RELATED APPLICATIONS

This application is a U.S. National Phase Application of International Patent Application No. PCT/EP2020/072606, filed Aug. 12, 2020, which claims priority to European Patent application Ser. No. 19/191,237.7, filed Aug. 12, 2019, the entire contents of which are hereby incorporated by reference herein.

The present invention relates to a process for producing an effect pigment paste comprising at least steps (1) and (2), namely producing a mixture comprising at least one effect pigment (a) and at least one polymer (b) in a liquid medium (c) (step (1)), and dispersing the mixture obtained after step (1) to obtain the effect pigment paste (step (2)), wherein step (2) is performed using a shaker and the effect pigment paste obtained after the performance of step (2) has ended is free of grinding media, to an effect pigment paste producible by this process, containing an amount of effect pigment of at least 5% by weight, based on the total weight of the effect pigment paste, and to a use of a shaker for dispersing of effect pigments for production of an effect pigment paste, wherein the effect pigment paste obtained after the dispersing has ended is free of grinding media.

STATE OF THE ART

Pigment pastes are known in the art. The use of pigment pastes significantly facilitates the technically complex process of pigment dispersion in the paints industry since it assures, for example, optimal wetting and dispersion of the pigments, such that an improved state of distribution is achieved in the resulting paint as well. This results in improved performance properties of the paint and of the paint system produced therefrom, for example a particularly homogeneous color or color distribution in the paint system. For the same reasons, effect pigment-containing pigment pastes (effect pigment pastes) are also initially prepared separately as an intermediate before incorporation into a paint, since direct incorporation of these pigments into the paint would otherwise entail the aforementioned problems.

Typically, effect pigment pastes are produced using dissolvers or stirrers that assure adequate homogenization of the effect pigments within the pastes. A disadvantage of these processes known in the prior art for production of effect pigment pastes, which typically envisage such stirrers and/or dissolvers, is that evolution of dust is often observed, which is undesirable for reasons of occupational safety of the production operatives. Moreover, in the case of performance of these processes, a downstream cleaning step is typically required, especially owing to dried-on pigment and/or binder agglomerates which settle out on the edge of the vessels used for production of the pastes in the case of use of the aforementioned stirrer and/or dissolver technology. Moreover, comparatively long processing times (stirring times) are often required, which is undesirable for economic reasons.

Homogenization is often accomplished using grinding media: For example, DE 10 2005 024722 A1 relates to pigment preparations produced by homogenizing pigments with suitable dispersants using mixed zirconia or corundum grinding media. The use of mixed zirconia grinding media is also known from US 2004/0059050 A1. WO 2012/002569 A1, WO 2009/068462 A1 and EP 1 080 810 A1 disclose the use of glass beads or steel balls as grinding media for the purpose.

However, these methods have the disadvantage that these grinding media used, on completion of production of the effect pigment pastes, subsequently have to be separated again therefrom in each case in a separate process step, for example by filtration. Moreover, the use of grinding media in the production of effect pigment pastes can lead to unwanted damage to the effect pigments.

There is therefore a need for effect pigment pastes produced by a process that does not have the aforementioned disadvantages.

OBJECT

It is therefore an object of the present invention to provide a process for producing effect pigment pastes that has advantages over the processes known from the prior art. More particularly, it is an object of the present invention to provide such a process for production of effect pigment pastes that makes it possible to dispense with a step of separation from grinding media typically used for production of effect pigment pastes. Moreover, the process should provide for very gentle dispersion of the effect pigments in order to avoid damage to the pigments in the course of the process for production of the effect pigment paste. Furthermore, it was an object of the present invention to provide a process for producing effect pigment pastes that enables a reduction in emissions in the form of pigment dusts and, if appropriate, additionally solvent vapors and a reduction in duration or complete avoidance of cleaning operations that result particularly therefrom.

Achievement

This object is achieved by the subject matter claimed in the claims and by the preferred embodiments of this subject matter that are described in the description that follows.

The present invention therefore firstly provides a process for producing an effect pigment paste comprising at least steps (1) and (2), namely
  (1) producing a mixture comprising at least one effect pigment (a) and at least one polymer (b) in a liquid medium (c), and
  (2) dispersing the mixture obtained after step (1) to obtain the effect pigment paste,
  wherein step (2) is performed using a shaker and the effect pigment paste obtained after the performance of step (2) has ended is free of grinding media.

The present invention further provides for use of a shaker for dispersing of effect pigments for production of an effect pigment paste, wherein the effect pigment paste obtained after the dispersing has ended is free of grinding media.

The present invention further provides an effect pigment paste producible by means of the process of the invention, i.e. by means of the process comprising at least steps (1) and (2), namely
  (1) producing a mixture comprising at least one effect pigment (a) and at least one polymer (b) in a liquid medium (c), and
  (2) dispersing the mixture obtained after step (1) to obtain the effect pigment paste,
  wherein step (2) is performed using a shaker and the effect pigment paste obtained after the performance of step (2) has ended is free of grinding media, and wherein the effect pigment paste contains an amount of effect pigment (a) of at least 5% by weight, based on the total weight of the effect pigment paste.

Effect pigment pastes with a minimum content of at least 5% by weight of effect pigment cannot be successfully produced by conventional processes which envisage stirring rather than shaking, as shown by the experimental data below, especially when the effect pigment (a) used is an aluminum effect pigment (cf. Experimental: comparative effect pigment paste VEP2 vs. effect pigment paste EP3).

It has been found that, surprisingly, the process for production of an effect pigment paste is notable for very substantially to completely dust-free processing of effect pigments during the formulation of the paste. This at least reduces emissions in the form of pigment dusts that typically occur and can likewise avoid or at least reduce associated cleaning operations, which makes the process advantageous from occupational safety and environmental aspects. Finally, the process of the invention thus additionally enables a constant quality of the effect pigment pastes produced.

In addition, it has been found that, surprisingly, the process of the invention has the feature that no mechanical removal of grinding media after production of the effect pigment paste is necessary and hence it is possible to dispense with a step of removal of such grinding media that are typically used. Overall, the process of the invention is thus advantageously also notable for a saving of time and hence for an economic advantage since it is possible to dispense with the aforementioned separation step.

In addition, it has been found that, surprisingly, the process of the invention, through use of a shaker, enables merely gentle dispersion of the effect pigments, by means of which it is possible to avoid damage to the pigments in the process of production of the effect pigment paste, but at least just as good dispersion of the effect pigments is nevertheless achieved as in the case of stirrers or dissolvers that are typically used.

In addition, the process of the invention, through the use of a shaker in step (2), surprisingly enables shorter processing times than conventional processes that are conducted using stirrers, which is advantageous for economic reasons.

Moreover, the process of the invention, through the use of the shaker, enables better standardization by comparison with conventional processes, for example a stirring process: when stirrers are used, it is necessary, for example, to adjust stirrer height and speed during the process of production of effect pigment pastes, whereas parameters such as frequency, time, can geometry and fill level when using a shaker are significantly easier to adjust by comparison.

Finally, it has been found that, surprisingly, the process of the invention, through use of a shaker, not only enables at least just as good dispersion of the effect pigments as that by customarily used stirrers or dissolvers, but there is additionally no requirement for any downstream cleaning step since, by contrast with conventional processes that are performed using stirrers and/or dissolvers, no dried-on pigment and/or binder agglomerates occur during the production operation.

DETAILED DESCRIPTION

The term "comprising" in the context of the present invention in connection with the effect pigment paste produced in accordance with the invention and also in connection with the process of the invention preferably has the meaning "consisting of". With regard to the effect pigment paste produced in accordance with the invention—as well as components (a), (b) and (c)—it is possible here for one or more of the further components mentioned below that are optionally present in the effect pigment paste produced in accordance with the invention to be present therein. Each of the components may be present in their preferred embodiments specified below. With regard to the process of the invention—in addition to steps (1) and (2)—one or more further steps among those mentioned as optional below may additionally be part of the process. Each of the steps may be used in their preferred embodiments specified below.

The term "dispersion" in connection with pigments or effect pigments in the context of the present invention is known to the person skilled in the art and is defined, for example, in Römpp Chemie Lexikon, Lacke and Druckfarben [Römpp's Chemical Lexicon, Paints and Printing Inks], Thieme Verlag, 1998, page 148. Accordingly, with reference to DIN 55943 (November 1993), this is understood to mean the dividing of agglomerates present in a pigment powder in a liquid medium, the dispersing medium, into smaller particles and simultaneous wetting thereof by the dispersing medium.

The term "pigment paste" is likewise known to the person skilled in the art and is defined, for example, in Römpp Lexikon, Lacke and Druckfarben, Thieme Verlag, 1998, page 452: pigment pastes are formulations of pigment mixtures in carrier materials such as polymers in which the pigments are present in a higher concentration than in the later use. An effect pigment paste is accordingly a pigment paste containing at least one effect pigment—namely at least one effect pigment (a)—as pigment. The later use of pigment pastes lies generally in the production of coating compositions, for example basecoats. A pigment paste such as an effect pigment paste should thus be distinguished from a coating composition such as a basecoat in that it merely constitutes a precursor for production of such a coating composition. A pigment paste as such therefore cannot itself be used as a coating composition. The relative weight ratio of pigments to polymers is typically higher in pigment pastes than in the coating compositions that the paste is ultimately used to produce. As well as the carrier materials such as the polymer (b), which are also referred to as paste binders, and effect pigment (a), the pigment paste also includes liquid diluents such as water and/or organic solvents that function as liquid medium (c). Different additives such as wetting agents and/or thickeners can also be used in a pigment paste. The terms "effect pigment paste" and "effect pigment dispersion" are interchangeable in the present context.

The person skilled in the art is additionally familiar with the term "shaker". This is understood to mean an apparatus capable of "shaking", i.e. of dispersing, the mixture obtained after step (1) within step (2) of the process of the invention to obtain the effect pigment paste by means of shaking. The terms "shaking" and "agitating" are interchangeable in the present context and are clearly delimited from the term "stirring". Especially in the case of use of a shaker, no additional auxiliaries as required in the case of use of a stirrer, such as stirrer bars, stirrer rods or stirrer paddles, are needed.

Process of the Invention

The process of the invention is a process for producing an effect pigment paste. The effect pigment paste obtained after the performance of step (2) of the process of the invention has ended is free of grinding media. Grinding media in the context of the present invention are conventional grinding media that are known to the person skilled in the art and are in a solid state of matter, are still in that state of matter after production of the respective pigment paste and do not change their form, especially plastic form, during the production of the pastes. Such conventional grinding media are especially grinding media composed of metals, semimetals, metal oxides, semimetal oxides, ceramic and glass.

Preferably, the process of the invention is conducted entirely without the use of grinding media. Alternatively, grinding media may be added to the mixture obtained after step (1) of the process of the invention or during the performance of step (1), and step (2) may be performed using these grinding media. In this case, however, it is a characteristic of the grinding media used that they are in the solid state of matter on commencement of the performance of step (2) but are converted completely to a liquid state of matter in the course of performance of step (2) and then become part of the liquid medium (c), or are themselves comminuted in the course of performance of step (2) and are then in dispersed form in the liquid medium (c), such that the effect pigment paste obtained after the performance of step (2) has ended is free of grinding media. Preferably, the grinding media used in this case are selected from the group consisting of frozen water, frozen organic solvents and grinding media composed of organic polymers and mixtures thereof.

Preferably, the process of the invention does not include any step that involves stirring.

The process of the invention for production of the effect pigment pastes does not have any methodical peculiarities otherwise, but can be effected by mixing at least the above-described essential constituents (a), (b) and (c) with one another and homogenizing the resulting mixture.

Step (1)

Step (1) of the process of the invention envisages the producing of a mixture comprising at least one effect pigment (a) and at least one polymer (b) in a liquid medium (c). The sequence of addition of the individual components is as desired, especially when the effect pigment (a) used is an aluminum effect pigment. If the effect pigment (a) used is a metal oxide-mica pigment, preference is given to initially charging all the components apart from the effect pigment (a) and adding it to the resulting mixture last.

Step (2)

Step (2) of the process of the invention envisages dispersing of the mixture obtained after performance of step (1) to obtain the effect pigment paste, with step (2) being performed using a shaker and the effect pigment paste obtained after the performance of step (2) has ended being free of grinding media.

Suitable shakers that may be used in step (2) of the process of the invention are commercial shakers. Examples of such shakers are, for example, devices from Fast & Fluid such as the SK550 device or the SK550 1.1 device from the Skandex range. The companies Collomix and Corob likewise offer suitable shakers.

Preference is given to performing step (2) in a vessel having a capacity within a range from 0.2 to 40 L. Preference is given to performing step (2) in a closed vessel. Preference is given to filling the vessel used with preference in step (2) such that the fill level of the vessel is within a range from 15% to 95%.

Suitable vessels are in principle vessels and/or containers of any kind. It is possible to use disposable containers or reusable containers. Preferably, the mixture obtained after step (1) of the process of the invention is introduced into a plastic bag and the dispersing in step (2) is performed in the plastic bag. In this case, the fill level is preferably within a range from 15% to 80%. The plastic bag is a reusable container and can be used more than once, even without intermediate cleaning, especially when effect pigment pastes of identical composition are being produced in repeated succession.

The duration of step (2) depends on the amount of effect pigment paste to be produced. In principle, however, the duration of performance of step (2) of the process of the invention is preferably not more than 20 minutes, more preferably not more than 18 minutes, most preferably not more than 16 minutes. Preferably, step (2) is performed over a duration of 1 to 15 minutes.

Preferably, the increase in temperature detected on performance of step (2) of the process of the invention is within a range from 0 to 40° C., preferably from 0.1 to 30° C.

Preferably, step (2) of the process of the invention is performed by shaking at a frequency within a range from 6 to 20 Hz, more preferably from 8 to 18 Hz, most preferably from 10 to 16 Hz.

Preferably, step (2) of the process of the invention is performed by shaking at an amplitude within a range from 1.0 to 8.0 cm, more preferably from 1.2 to 7.0 cm, most preferably from 1.4 to 6.5 cm.

Preferably, step (2) of the process of the invention is performed by shaking at an acceleration within a range from >1 G to 26 G, more preferably from 2 to 23 G, especially from 4 to 19 G.

Effect Pigment Paste

The solids content of the effect pigment paste produced in accordance with the invention is preferably within a range from 15% to 65% by weight, more preferably from 17.5% to 60% by weight, even more preferably from 20% to 55% by weight, especially from 22.5% to 50% by weight, most preferably from 25% to 45% by weight, based in each case on the total weight of the effect pigment paste. The solids content, i.e. the nonvolatile component, is determined by the method described hereinafter.

The proportions in % by weight of all components (a), (b) and (c) present in the effect pigment paste of the invention and of any further components additionally present add up to 100% by weight, based on the total weight of the effect pigment paste.

Effect Pigment Paste—Effect Pigment (a)

The effect pigment paste produced in accordance with the invention comprises at least one effect pigment as component (a), preferably in an amount of at least 10% by weight, based on the total weight of the effect pigment paste.

A skilled person is familiar with the concept of effect pigments. A corresponding definition is found in, for example, Römpp Lexikon, Lacke and Druckfarben, Thieme Verlag, 1998, pages 176 and 471. A definition of pigments in general and further specifications thereof are laid down in DIN 55943 (date: October 2001). Effect pigments are preferably pigments which impart a visual effect or a color and visual effect, more particularly a visual effect. The terms "visual-effect imparting and color-imparting pigment", "visual-effect imparting pigment", and "effect pigment" are therefore preferably interchangeable.

Preferred effect pigments are, for example, platelet-shaped metal effect pigments such as leaflet-shaped aluminum pigments, gold bronzes, oxidized bronzes and/or iron oxide-aluminum pigments, pearlescent pigments such as pearl essence, basic lead carbonate, bismuth oxide chloride and/or metal oxide-mica pigments (mica) and/or other effect pigments such as leaflet-shaped graphite, leaflet-shaped iron oxide, multilayer effect pigments composed of PVD films and/or liquid crystal polymer pigments. More preferably, leaflet-shaped effect pigments, especially leaflet-shaped aluminum pigments and metal oxide-mica pigments, are present in the pigment paste. Preferably, the at least one effect pigment (a) present in the effect pigment paste of the invention is therefore at least one metallic effect pigment such as at least one preferably leaflet-shaped aluminum effect pigment and/or at least one metal oxide-mica pigment.

The effect pigment (a) used is preferably in the form of a powder.

The effect pigment paste produced in accordance with the invention may optionally contain further pigments other than the at least one effect pigment (a), especially color pigments and/or fillers. However, the effect pigment paste produced in accordance with the invention preferably does not contain any such further pigment as a color pigment, nor any filler.

The effect pigment paste produced in accordance with the invention preferably contains a proportion of effect pigment (a) of at least 5% by weight, more preferably of at least 7% by weight, even more preferably of at least 10% by weight, especially of at least 13% by weight, most preferably of at least 15% by weight, based in each case on the total weight of the effect pigment paste. The effect pigment paste produced in accordance with the invention preferably contains a proportion of effect pigment (a) within a range from 5% to 85% by weight, more preferably from 7% to 80% by weight, even more preferably from 10% to 75% by weight, especially from 13% to 70% by weight, most preferably from 15% to 65% by weight or from 15% to 60% by weight, based in each case on the total weight of the effect pigment paste.

Effect Pigment Paste—Polymer (b)

The polymer (b) present in the effect pigment paste produced in accordance with the invention is used as pigment paste binder (paste binder). The term "binder" in the context of the present invention, in accordance with DIN EN ISO 4618 (German version, date: March 2007), is preferably understood to mean the nonvolatile fractions responsible for film formation in a composition such as the effect pigment paste produced in accordance with the invention or the effect pigment paste of the invention, except for the pigments present therein such as the at least one effect pigment (a) and any other pigments and/or fillers present. The nonvolatile fraction may be determined by the method described below. A binder constituent is accordingly a specific component which contributes to the binder content of a composition such as the effect pigment paste produced in accordance with the invention.

The polymer (b) is preferably used in the form of an aqueous or solventborne dispersion for production of the effect pigment paste.

Polymers (b) used may be what are called seed-core-shell polymers (SCS polymers). Such polymers are known, for example, from WO 2016/116299 A1.

Polymers (b) used may alternatively or additionally be at least one polymer selected from the group consisting of polyurethanes, polyureas, polyesters, poly(meth)acrylates and/or copolymers of said polymers, especially polyurethane-poly(meth)acrylates and/or polyurethane-polyureas.

Preferred polyurethanes are described, for example, in German patent application DE 199 48 004 A1, page 4 line 19 to page 11 line 29 (polyurethane prepolymer B1), in European patent application EP 0 228 003 A1, page 3 line 24 to page 5 line 40, in European patent application EP 0 634 431 A1, page 3 line 38 to page 8 line 9, and in international patent application WO 92/15405, page 2 line 35 to page 10 line 32.

Preferred polyesters are described, for example, in DE 4009858 A1 in column 6 line 53 to column 7 line 61 and column 10 line 24 to column 13 line 3, or WO 2014/033135 A2, page 2 line 24 to page 7 line 10 and page 28 line 13 to page 29 line 13.

Preferred polyurethane-poly(meth)acrylate copolymers ((meth)acrylated polyurethanes) and the preparation thereof are described, for example, in WO 91/15528 A1, page 3 line 21 to page 20 line 33, and in DE 4437535 A1, page 2 line 27 to page 6 line 22.

Preferred polyurethane-polyurea copolymers are polyurethane-polyurea particles, where the polyurethane-polyurea particles contain, each in reacted form, at least one polyurethane prepolymer containing isocyanate groups and containing anionic groups and/or groups convertible to anionic groups and at least one polyamine containing two primary amino groups and one or two secondary amino groups. Preferably, such copolymers are used in the form of an aqueous dispersion. Such polymers are preparable in principle by conventional polyaddition of, for example, polyisocyanates with polyols and also polyamines.

The polymers (b) may each have functional groups, especially selected from the group consisting of OH groups, COOH groups and amino groups, especially OH groups. Particular preference is given to hydroxy-functional polyurethane-poly(meth)acrylate copolymers and hydroxy-functional polyesters, and also hydroxy-functional polyurethane-polyurea copolymers.

The effect pigment paste produced in accordance with the invention preferably contains a proportion of polymer (b) within a range from 1.0% to 25% by weight, more preferably from 1.5% to 20% by weight, even more preferably from 2.0% to 17.5% by weight, especially from 2.5% to 15% by weight, most preferably from 4.0% to 12.5% by weight, based in each case on the total weight of the effect pigment paste. The proportion of the polymer (b) in the effect pigment paste can be determined or fixed via the determination of the solids content (also called nonvolatile fraction) of a dispersion containing the polymer (b) which is used for production of the effect pigment paste.

The relative weight ratio of the at least one effect pigment (a) to the polymer (b) in the effect pigment paste is preferably at least 1:1 or at least 1.2:1 or at least 1.5:1 or higher in each case, more preferably at least 2.0:1 or higher, even more preferably at least 2.5:1 or higher, especially at least 3.0:1 or higher. Preferably, the relative weight ratio of the at least one effect pigment (a) to the polymer (b) in the effect pigment paste is within a range from 10:1 to 1:1 or from 8:1 to 1:1, more preferably within a range from 10:1 to 1.2:1 or from 10:1 to 1.5:1 or within a range from 8:1 to 1.2:1 or from 8:1 to 1.5:1.

Effect Pigment Paste—Component (c)

Step (1) of the process of the invention envisages the producing of a mixture comprising at least one effect pigment (a) and at least one polymer (b) in a liquid medium (c). For provision of a liquid medium (c) in step (1), preference is given to providing at least one diluent that accordingly functions as component (c). The effect pigment paste produced in accordance with the invention therefore preferably comprises at least one such diluent.

The diluent used may be water and/or at least one organic solvent.

The effect pigment paste produced in accordance with the invention may be aqueous. This is preferably a system containing water as main constituent as solvent, preferably in an amount of at least 20% by weight, and organic solvents in smaller proportions, preferably in an amount of <20% by weight, based in each case on the total weight of the effect pigment paste. The effect pigment paste in that case preferably contains a proportion of water of at least 20% by weight, more preferably of at least 25% by weight, even more preferably of at least 30% by weight, especially of at least 35% by weight, most preferably of at least 40% by weight, based in each case on the total weight of the effect pigment paste. The effect pigment paste in that case preferably contains a proportion of water within a range from 20% to 75% by weight, more preferably within a range from 25% to 70% by weight, even more preferably within a range from 30% to 65% by weight or to 60% by weight or to 57.5% by weight, based in each case on the total weight of the effect pigment paste. In this case, the effect pigment paste preferably contains a proportion of organic solvents within a region of <20% by weight, more preferably within a range from 0% to <20% by weight, even more preferably within a range from 0.5% to 20% by weight or to 17.5% by weight or to 15% by weight, based in each case on the total weight of the effect pigment paste.

Alternatively, the effect pigment paste produced in accordance with the invention may be solvent-based. This is preferably a system containing organic solvents as main constituent as solvent, preferably in an amount of at least 20% by weight, and water in smaller proportions, preferably in an amount of <20% by weight, based in each case on the total weight of the effect pigment paste. The effect pigment paste in that case preferably contains a proportion of organic solvents of at least 20% by weight, more preferably of at least 25% by weight, even more preferably of at least 30% by weight, especially of at least 35% by weight, most preferably of at least 40% by weight, based in each case on the total weight of the effect pigment paste. The effect pigment paste in that case preferably contains a proportion of organic solvents within a range from 20% to 75% by weight, more preferably within a range from 25% to 70% by weight, even more preferably within a range from 30% to 65% by weight or to 60% by weight or to 57.5% by weight, based in each case on the total weight of the effect pigment paste. In this case, the effect pigment paste preferably contains a proportion of water within a region of <20% by weight, more preferably within a range from 0% to <20% by weight, even more preferably within a range from 0.5% to 20% by weight or to 17.5% by weight or to 15% by weight, based in each case on the total weight of the effect pigment paste.

The addition of organic solvents is an option especially in the case of effect pigment pastes containing aluminum effect pigments as effect pigment (a). The effect pigment pastes of the invention may alternatively be entirely or virtually entirely free of organic solvents, especially when metal oxide-mica pigments (mica) are used as effect pigment (a).

The skilled person is familiar with the term "organic solvent". This term is defined for example in Council Directive 1999/13/EC of Mar. 11, 1999 (Article 2, section 18) (referred to therein as "solvent"). Examples of such organic solvents include (hetero)cyclic, (hetero)aliphatic, or (hetero)aromatic hydrocarbons, mono- or polyfunctional alcohols, ethers, esters, ketones and amides, such as N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone, methyl isobutyl ketone, acetone, isophorone, or mixtures thereof.

Effect Pigment Paste—Further Optional Components

The effect pigment paste produced in accordance with the invention may contain further optional constituents or optional components:

In addition to the at least one effect pigment (a), the effect pigment paste may additionally contain typical color pigments other than the effect pigment (a). A skilled person is familiar with the concept of color pigments. The terms "coloring pigment" and "color pigment" are interchangeable. Color pigments used may be inorganic and/or organic pigments. The color pigment is preferably an inorganic color pigment. Particularly preferred color pigments used are white pigments, chromatic pigments and/or black pigments. Examples of white pigments are titanium dioxide, zinc white, zinc sulfide and lithopone. Examples of black pigments are carbon black, iron-manganese black and spinel black. Examples of chromatic pigments are chromium oxide, chromium oxide hydrate green, cobalt green, ultramarine green, cobalt blue, ultramarine blue, manganese blue, ultramarine violet, cobalt and manganese violet, iron oxide red, cadmium sulfoselenide, molybdate red and ultramarine red, iron oxide brown, mixed brown, spinel and corundum phases and chromium orange, iron oxide yellow, nickel-titanium yellow, chromium-titanium yellow, cadmium sulfide, cadmium zinc sulfide, chromium yellow and bismuth vanadate. The proportion of the color pigments is preferably in the range from 1.0% to 40.0% by weight, preferably 2.0% to 35.0% by weight, more preferably 5.0% to 30.0% by weight, based in each case on the total weight of the aqueous effect pigment paste. Preferably, however, the effect pigment paste produced in accordance with the invention contains the at least one effect pigment (a) as the sole pigment, meaning that it preferably does not contain any additional color pigments. The effect pigment paste preferably additionally does not contain any fillers.

The effect pigment paste may optionally contain at least one thickener (also referred to as thickening agent). Examples of such thickeners are inorganic thickeners, for example metal silicates such as sheet silicates, and organic thickeners, for example poly(meth)acrylic acid thickeners and/or (meth)acrylic acid-(meth)acrylate copolymer thickeners, polyurethane thickeners and polymeric waxes. The metal silicate is selected preferably from the group of the smectites. With particular preference the smectites are selected from the group of montmorillonites and hectorites. The montmorillonites and hectorites are selected more particularly from the group consisting of aluminum-magnesium silicates and also sodium-magnesium and sodium-magnesium-fluorine-lithium sheet silicates. These inorganic sheet silicates are sold, for example, under the Laponite® brand. Thickeners based on poly(meth)acrylic acid and (meth) acrylic acid-(meth)acrylate copolymer thickeners have optionally been crosslinked and/or neutralized with a suitable base. Examples of such thickeners are "alkali swellable emulsions" (ASEs), and hydrophobically modified variants of these, the "hydrophobically modified alkali swellable emulsions" (HASEs). These thickeners are preferably anionic. Corresponding products such as Rheovis® AS 1130 are available commercially. Thickeners based on polyurethanes (e.g. polyurethane associative thickeners) are optionally crosslinked and/or neutralized with a suitable base. Corresponding products such as Rheovis® PU 1250 are available commercially. Examples of suitable polymeric waxes include optionally modified polymeric waxes based on ethylene-vinyl acetate copolymers. A corresponding product is commercially available, for example, under the Aquatix® 8421 name. The at least one thickener is preferably present in the effect pigment paste produced in accordance with the invention in an amount of not more than 10% by weight, more preferably of not more than 7.5% by weight, even more preferably of not more than 5% by weight, especially of not more than 3% by weight, most preferably of not more than 2% by weight, based in each case on the total weight of the effect pigment paste.

The effect pigment paste produced in accordance with the invention, according to the desired application, may contain one or more customarily used additives as further component(s). For example, as already set out above, the effect pigment paste may contain a particular proportion of at least one organic solvent. In addition, the effect pigment paste may contain at least one additive selected from the group consisting of reactive diluents, light stabilizers, antioxidants, deaerators, emulsifiers, slip additives, polymerization inhibitors, initiators for free-radical polymerizations, adhesion promoters, leveling agents, film-forming auxiliaries, sag control agents (SCAs), flame retardants, corrosion inhibitors, siccatives, biocides and flatting agents. They can be used in the known and customary proportions. The content thereof, based on the total weight of the effect pigment paste, is preferably 0.01% to 20.0% by weight, more preferably 0.05% to 15.0% by weight, especially preferably 0.1% to 10.0% by weight, very especially preferably 0.1% to 7.5% by weight, especially 0.1% to 5.0% by weight and most preferably 0.1% to 2.5% by weight.

Effect Pigment Paste of the Invention

By means of the process of the invention, it is possible to produce an effect pigment paste. The present invention further provides an effect pigment paste producible by means of the process of the invention, wherein the effect pigment paste contains an amount of effect pigment (a) of at least 20% by weight, based on the total weight of the effect pigment paste, especially when the at least one effect pigment is an aluminum effect pigment. Effect pigment pastes having a minimum content of at least 20% by weight of effect pigment are not successfully producible by means of conventional processes including a stirring operation, as shown by the experimental data that follow (cf. Experimental: comparative effect pigment paste VEP2 vs. effect pigment paste EP3).

All the preferred embodiments described hereinabove in connection with the process of the invention are also preferred embodiments with regard to the effect pigment paste of the invention.

Use of the Invention

The shaker used in step (2) of the process of the invention is suitable for dispersion of effect pigments for production of an effect pigment paste.

The present invention therefore further provides for use of a shaker for dispersing of effect pigments for production of an effect pigment paste, wherein the effect pigment paste obtained after the dispersing has ended is free of grinding media. The effect pigment paste is preferably that produced by means of the process of the invention.

All the preferred embodiments described hereinabove in connection with the effect pigment paste produced in accordance with the invention and the process of the invention are also preferred embodiments with regard to the use of the shaker for dispersing of effect pigments for production of an effect pigment paste.

Methods of Determination

1. Determining the Nonvolatile Fraction

The nonvolatile fraction (or solids content) is determined in accordance with DIN EN ISO 3251 (date: June 2008). This determination is accomplished by weighing out 1 g of sample into an aluminum dish dried beforehand and carrying out drying in a drying oven at 125° C. for 60 minutes, followed by cooling in a desiccator, and then by reweighing. The residue, relative to the total amount of the sample employed, corresponds to the nonvolatile fraction.

2. Determining the Number-Average and Weight-Average Molecular Weights

The number-average molecular weight ($M_n$) is determined by means of gel permeation chromatography (GPC). The method of determination is in accordance with DIN 55672-1 (date: August 2007). As well as the number-average molecular weight, this method can also be used to determine the weight-average molecular weight ($M_w$) and also the polydispersity (ratio of weight-average molecular weight ($M_w$) to number-average molecular weight ($M_n$)). Tetrahydrofuran is used as eluent. The determination is made against polystyrene standards. The column material consists of styrene-divinylbenzene copolymers.

3. Determining the OH Number

The OH number is determined in accordance with R. P. Krüger, R. Gnauck and R. Algeier, Plaste and Kautschuk, 20, 274 (1982), by means of acetic anhydride in the presence of 4-dimethylaminopyridine as a catalyst in a tetrahydrofuran (THF)/dimethylformamide (DMF) solution at room temperature (18 to 23° C.), by fully hydrolyzing the excess of acetic anhydride remaining after acetylation and conducting a potentiometric back-titration of the acetic acid with alcoholic potassium hydroxide solution. The acetylation time is 60 minutes and is sufficient to guarantee complete conversion.

4. Assessment of the Incidence of Specks

To assess the incidence of specks, the effect pigment pastes are investigated by the following general protocol:

The respective paste is applied by means of a 100 μm four-way bar applicator (when using aluminum effect pigments) or a 50 μm four-way bar applicator (when using mica effect pigments) to a glass panel measuring 9 cm×15 cm. The film thus formed, after a 10-minute drying time at 80° C. in an air circulation oven, is assessed visually for the incidence of specks, by holding it against a light source so as not to misinterpret any air inclusions as specks. A rating of 1-5 is awarded (1=no specks/5=very many specks). Grade 1 corresponds to the indication "OK" (acceptable).

INVENTIVE AND COMPARATIVE EXAMPLES

The inventive and comparative examples below serve to illustrate the invention, but should not be interpreted as imposing any restriction.

Unless indicated otherwise, the amounts in parts are parts by weight, and the amounts in percent are percentages by weight, in each case.

1. Characterization of the Components Used

Polyester Component:
Polyester 1: prepared according to DE 4009858 A1, example D (column 16 line 37 to column 6 line 60)
Alu Stapa Hydrolux® 2154:
Commercial aluminum effect pigment, available from Altana-Eckart, with a solids content of 65% by weight
Mearlin® Exterior Super Red 439Z: Commercial mica effect pigment, available from Merck
Mearlin® Exterior Fine Violet 539 V: Commercial mica effect pigment, available from Merck 2. Effect Pigment Pastes Using Aluminum Effect Pigments 2.1 Comparative Effect Pigment Paste VEP1

A comparative effect pigment paste VEP1 composed of 33.33 parts by weight of polyester 1, 33.33 parts by weight of Alu Stapa Hydrolux® 2154 and 33.33 parts by weight of butylglycyl is produced as follows, using 4000 g of the aforementioned components in each case:

Butylglycyl is initially charged in a vessel, Alu Stapa Hydrolux® 2154 is added in portions while stirring, and the resulting mixture is stirred for a period of 15 minutes. The stirring speed is adjusted such that a vortex is clearly visible. Then the polyester component is added while stirring and the resulting mixture is stirred for a period of 15 minutes. The processing time is thus 30 minutes in total. After the stirring operation had ended, owing to dust formation and settling of pigment and polyester residues on the edge of the vessel, cleaning was necessary. No formation of specks was observed (acceptable).

2.2 Inventive Effect Pigment Paste EP1

An inventive effect pigment paste EP1 composed of 33.33 parts by weight of polyester 1, 33.33 parts by weight of Alu Stapa Hydrolux® 2154 and 33.33 parts by weight of butylglycyl is produced as follows, using 200 g of the aforementioned components in each case:

The three aforementioned components are combined in any sequence in a vessel having a capacity of 1 L (disposable container) and shaken without further premixing over a period of 12 minutes. The shaker used is the SK550 device from Fast & Fluid. The frequency during the shaking is 12 Hz. The processing time is thus only 6 minutes in total. No cleaning was necessary because no dust formation and no settling of pigment and polyester residues was observed. No formation of specks was observed (acceptable).

2.3 Inventive Effect Pigment Paste EP2

An inventive effect pigment paste EP2 composed of 33.33 parts by weight of polyester 1, 33.33 parts by weight of Alu Stapa Hydrolux® 2154 and 33.33 parts by weight of butylglycyl is produced as follows, using 50 g of the aforementioned components in each case:

The three aforementioned components are combined in any sequence in a vessel having a capacity of 0.25 L (disposable container) and shaken without further premixing over a period of 3 minutes. The shaker used is the SK550 device from Fast & Fluid. The frequency during the shaking is 12 Hz. The processing time is thus only 3 minutes in total. No cleaning was necessary because no dust formation and no settling of pigment and polyester residues was observed. No formation of specks was observed (acceptable).

2.4 Inventive Effect Pigment Paste EP3

An inventive effect pigment paste EP3 composed of 50% by weight of polyester 1, 45% by weight of Alu Stapa Hydrolux® 2154 and 5% by weight of butylglycyl is produced as follows, using 600 g of butylglycyl, 6000 g of polyester 1 and 5400 g of Alu Stapa Hydrolux® 2154:

The three aforementioned components are combined in any sequence in a vessel having a capacity of 18 L (disposable container) and shaken without further premixing over a period of 12 minutes. The shaker used is the SK550 device from Fast & Fluid. The frequency during the shaking is 12 Hz. The processing time is thus only 12 minutes in total. No cleaning was necessary because no dust formation and no settling of pigment and polyester residues was observed. No formation of specks was observed (acceptable).

2.5 Comparative Effect Pigment Paste VEP2

An attempt was made to produce a comparative effect pigment paste VEP2 from 50% by weight of polyester 1, 45% by weight of Alu Stapa Hydrolux® 2154 and 5% by weight of butylglycyl, using 600 g of butylglycyl, 6000 g of polyester 1 and 5400 g of Alu Stapa Hydrolux® 2154, and using the production method described under 2.1 in connection with VEP1. However, the resulting mixture had such a high viscosity that stirring was impossible and VEP2 was therefore not producible under these conditions.

2.6 Inventive Effect Pigment Paste EP4

An inventive effect pigment paste EP4 composed of 33.33 parts by weight of polyester 1, 33.33 parts by weight of Alu Stapa Hydrolux® 2154 and 33.33 parts by weight of butylglycyl is produced as follows, using 4000 g of the aforementioned components in each case:

The three aforementioned components are combined in any sequence in a plastic bag as an example of a disposable container, which is closed, and the mixture in the bag without further premixing is shaken over a period of 12 minutes. The shaker used is the SK550 device from Fast & Fluid. The frequency during the shaking is 12 Hz. The processing time is thus only 12 minutes in total. No cleaning was necessary because no dust formation and no settling of pigment and polyester residues was observed. No formation of specks was observed (acceptable).

3. Effect Pigment Pastes Using Mica Effect Pigments 3.1 Comparative Effect Pigment Paste VEP3

A comparative effect pigment paste VEP3 composed of 75 parts by weight of a mixed paint ML1 and 25 parts by weight of Mearlin® Exterior Super Red 439Z is produced as follows, using 9000 g of ML1 and 3000 g of Mearlin® Exterior Super Red 439Z:

Firstly, ML1 is produced by mixing the following components together: Rheovis® AS 1130 (commercially available polymer as thickener), Dispex® Ultra FA 4437 (commercially available additive), 2,4,7,9-tetramethyldec-5-ynediol, 52% in butylglycyl (available from BASF SE) and deionized water, and also 10% dimethylethanolamine in water.

ML1 is initially charged in a vessel with a capacity of 18 L (disposable container) and the mica effect pigment is added gradually by means of a dissolver, in the course of which it should be ensured that no pigment agglomerates form on the edge and in the dissolver. This operation takes about 20 minutes. After the addition of pigment has ended, the resulting mixture is dissolved for a further 20 minutes. The processing time is thus 40 minutes in total. Cleaning was necessary because dust formation and settling of pigment and polyester residues was observed. Adhering mica and binder particles were found on the stirrer and on the walls of the vessel.

3.2 Inventive Effect Pigment Paste EP5

An effect pigment paste EP5 composed of 75 parts by weight of ML1 and 25 parts by weight of Mearlin® Exterior Super Red 439Z is produced as follows, using 9000 g of ML1 and 3000 g of Mearlin® Exterior Super Red 439Z:

ML1 is produced here as described under point 3.1.

The two aforementioned components are combined in any sequence in a vessel having a capacity of 18 L (disposable container) and shaken without further premixing over a period of 12 minutes. The shaker used is the SK550 device from Fast & Fluid. The frequency during the shaking is 12 Hz. The processing time is thus only 12 minutes in total. No cleaning was necessary because no dust formation and no settling of pigment and polyester residues was observed. No formation of specks was observed (acceptable).

The invention claimed is:

1. A process for producing an effect pigment paste comprising at least steps (1) and (2),
    (1) producing a mixture comprising at least one effect pigment (a) and at least one polymer (b) in a liquid medium (c), by mixing the at least one effect pigment (a), the at least one polymer (b), and the liquid medium (c) with one another, and
    (2) dispersing the mixture obtained after step (1) by shaking to obtain the effect pigment paste without any further premixing,
    wherein step (2) is performed using a shaker and the effect pigment paste obtained after the performance of step (2) has ended is free of grinding media.

2. The process as claimed in claim 1, wherein the at least one effect pigment (a) used is a metal effect pigment and/or a metal oxide-mica pigment.

3. The process as claimed in claim 1, wherein the at least one effect pigment (a) used is an aluminum pigment.

4. The process as claimed in claim 1, wherein step (2) is performed in a closed vessel.

5. The process as claimed in claim 1, wherein the mixture obtained after step (1) is introduced into a plastic bag and the dispersing in step (2) is performed in the plastic bag.

6. The process as claimed in claim 1, wherein step (2) is performed by shaking at a frequency within a range from 6 to 20 Hz.

7. The process as claimed in claim 1, wherein step (2) is performed by shaking at an amplitude within a range from 1.0 to 8.0 cm.

8. The process as claimed in claim 1, wherein the effect pigment paste contains the at least one effect pigment (a) in an amount of at least 5% by weight, based in each case on the total weight of the effect pigment paste.

9. The process as claimed in claim 1, wherein step (2) is performed over a period of 1 to 15 minutes.

10. The process as claimed in claim 1, wherein the polymer (b) is selected from the group consisting of polyurethanes, polyureas, polyesters, poly(meth)acrylates, copolymers of said polymers, seed-core-shell polymers, and mixtures thereof.

11. The process as claimed in claim 1, wherein it is performed without the use of grinding media.

12. The process as claimed in claim 1, wherein grinding media are added to the mixture obtained after step (1) and step (2) is performed using these grinding media, with the grinding media in the solid state of matter on commencement of the performance of step (2) but being converted completely to a liquid state of matter in the course of performance of step (2) and becoming part of the liquid medium (c), or themselves being comminuted in the course of performance of step (2) and then being in dispersed form in the liquid medium (c), such that the effect pigment paste obtained after the performance of step (2) has ended is free of grinding media.

13. The process as claimed in claim 12, wherein the grinding media are selected from the group consisting of frozen water, frozen organic solvents and grinding media composed of organic polymers, and mixtures thereof.

14. The process as claimed in claim 1, wherein the at least steps (1) and (2) are free of any stirring.

15. The process as claimed in claim 1, wherein the step (2) is performed in less than 20 minutes.

16. An effect pigment paste produced by the process as claimed in claim 1, wherein the effect pigment paste contains an amount of effect pigment (a) of at least 5% by weight, based on the total weight of the effect pigment paste.

17. The effect pigment paste as claimed in claim 16, wherein the effect pigment paste has a water content of at most 20 wt.-%, based on the total weight of the effect pigment paste.

18. A method of using a shaker for dispersing effect pigments for producing an effect pigment paste, the method comprising dispersing a mixture comprising at least one effect pigment with the shaker to obtain the effect pigment paste without any further premixing, wherein the effect pigment paste obtained after the dispersing has ended is free of grinding media.

19. The method as claimed in claim 18, wherein the mixture comprises at least one effect pigment (a) and at least one polymer (b) in a liquid medium (c), wherein the mixture is obtained by mixing the at least one effect pigment (a), the at least one polymer (b), and the liquid medium (c) with one another.

* * * * *